United States Patent
Finn

(10) Patent No.: US 10,079,748 B2
(45) Date of Patent: *Sep. 18, 2018

(54) SUPPORTING EFFICIENT AND ACCURATE SYNC/FOLLOWUP TIMESTAMPS

(71) Applicant: Cisco Technology, Inc., San Jose, CA (US)

(72) Inventor: Norman W. Finn, Livermore, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 14/809,059

(22) Filed: Jul. 24, 2015

(65) Prior Publication Data

US 2015/0333996 A1    Nov. 19, 2015

Related U.S. Application Data

(63) Continuation of application No. 12/020,414, filed on Jan. 25, 2008, now Pat. No. 9,112,632.

(51) Int. Cl.
*H04L 12/26* (2006.01)
*H04L 12/863* (2013.01)
*H04J 3/06* (2006.01)

(52) U.S. Cl.
CPC .......... *H04L 43/106* (2013.01); *H04J 3/0697* (2013.01); *H04L 47/50* (2013.01); *H04J 3/0667* (2013.01)

(58) Field of Classification Search
CPC ...... H04L 43/106; H04L 47/50; H04J 3/0697; H04J 3/0667

USPC ................. 370/350, 503, 509, 469
See application file for complete search history.

(56) References Cited

U.S. PATENT DOCUMENTS

| | | |
|---|---|---|
| 6,470,031 B1 | 10/2002 | Dietmar et al. |
| 6,697,419 B1 * | 2/2004 | Pascal .................. G06K 7/0008 375/219 |
| 6,816,510 B1 | 11/2004 | Banerjee |
| 7,065,779 B1 | 6/2006 | Crocker et al. |

(Continued)

FOREIGN PATENT DOCUMENTS

| | | |
|---|---|---|
| EP | 1351472 A2 | 10/2003 |
| KR | 10-2003-0079069 A | 10/2003 |

(Continued)

*Primary Examiner* — Christine Ng
(74) *Attorney, Agent, or Firm* — Polsinelli PC

(57) ABSTRACT

In one embodiment, a physical (PHY) layer (lower protocol stack layer) of a device may add a timestamp to a received frame, and pass the frame and timestamp up the protocol stack toward a synchronization (sync) recognition layer (upper protocol stack layer). The sync recognition layer determines whether the frame relates to synchronization, and if so, places the timestamp into a data structure along with a frame association for recovery by followup processing. Conversely, in another embodiment, the sync recognition layer may add to a frame for transmission a frame ID having an indication of whether to timestamp the frame and may pass the frame and frame ID down the protocol stack toward the PHY layer. The PHY layer determines whether the frame ID indicates that the frame is to be timestamped, and if so, places a timestamp corresponding to frame transmission into a data structure with the frame ID.

20 Claims, 6 Drawing Sheets

(56) References Cited

U.S. PATENT DOCUMENTS

| | | |
|---|---|---|
| 7,260,119 B2 | 8/2007 | Sala et al. |
| 7,310,334 B1 | 12/2007 | Fitzgerald et al. |
| 7,379,435 B1 | 5/2008 | Kinder |
| 7,394,830 B2 | 7/2008 | Chapman |
| 7,792,158 B1 * | 9/2010 | Cho ............... H04J 3/0664 370/350 |
| 9,112,632 B2 * | 8/2015 | Finn ............... H04L 47/50 |
| 2003/0120802 A1 | 6/2003 | Kohno |
| 2003/0185245 A1 | 10/2003 | Kang et al. |
| 2004/0013245 A1 * | 1/2004 | Yokoyama ......... G10L 19/07 379/88.1 |
| 2004/0177162 A1 * | 9/2004 | Wetzel ............. H04L 29/06 709/248 |
| 2005/0221797 A1 * | 10/2005 | Howard ............ H04W 12/04 455/411 |
| 2006/0168612 A1 | 7/2006 | Chapman et al. |
| 2007/0008993 A1 | 1/2007 | Cha et al. |
| 2007/0123104 A1 * | 5/2007 | Hisatomi ........... H04N 7/163 439/607.01 |
| 2007/0268938 A1 * | 11/2007 | Dowd .............. H04J 3/0697 370/509 |
| 2008/0117938 A1 * | 5/2008 | Erich .............. H04J 3/0697 370/503 |
| 2008/0123555 A1 * | 5/2008 | Qi ................. H04L 63/08 370/254 |

FOREIGN PATENT DOCUMENTS

| | | |
|---|---|---|
| WO | 2006/063922 A1 | 6/2006 |
| WO | 2007137085 | 11/2007 |
| WO | 2008015492 | 2/2008 |

* cited by examiner

SUPPORTING EFFICIENT AND ACCURATE SYNC/FOLLOWUP TIMESTAMPS

RELATED APPLICATIONS

This application is a continuation of U.S. patent application Ser. No. 12/020,414, entitled "SUPPORTING EFFICIENT AND ACCURATE SYNC/FOLLOWUP TIMESTAMPS," filed Jan. 25, 2008, which is incorporated herein by reference in its entirety.

TECHNICAL FIELD

The present disclosure relates generally to computer networks, and, more particularly, to timestamps for synchronization and followup.

BACKGROUND

It is often desirable to measure the time it takes for a frame (or packet) to travel from one device in a computer network to another. Such measurements may be used to determine a transmission delay across the network for various diagnostic and contractual verification reasons, and to synchronize time-of-day clocks among network devices. Many of the current techniques to address the measurement of time that have been used and/or proposed have a number of problematic issues that have yet to be addressed, or are otherwise cumbersome or lacking in accuracy.

For example, certain timestamp protocols require the use of multiple frame types, each type having multiple fields to be populated in a specific format, which, notably, requires a recomputation of a frame checksum value. Other timestamp protocols also do not account for the time a frame is temporarily stored ("waiting time") in a data structure, such as a queue, prior to transmission. In addition, functions required by certain protocols that involve data insertion and removal to/from the frames can be made difficult or impossible by various security protocols, such as MACsec (Media Access Control security), or at Layer 3, IPsec (Internet Protocol security). That is, once the frame is encrypted, the timestamp information (e.g., an indication that the frame is a timestamp/sync frame) may be lost or difficult to obtain, and it can be extremely difficult to insert a timestamp into an encrypted frame.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
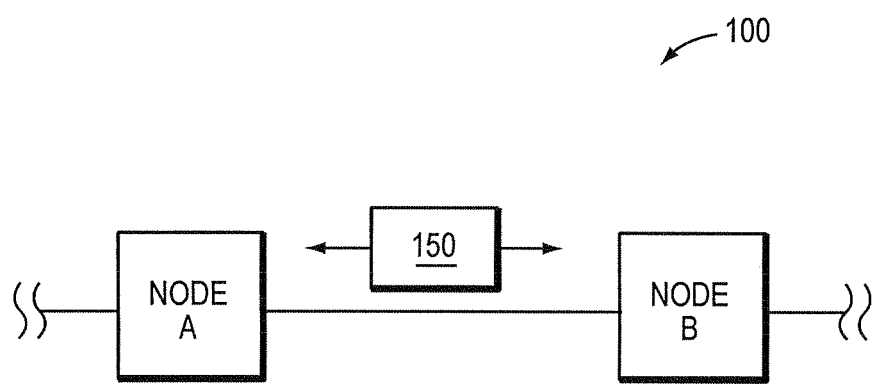
FIG. 1 illustrates an example computer network.

According to embodiments of the disclosure, upon receiving a frame from a computer network, a physical (PHY) layer at a lower layer of a protocol stack of a device may add a timestamp to the received frame, and pass the received frame and timestamp up the protocol stack toward a synchronization (sync) recognition layer at an upper layer of the protocol stack. The sync recognition layer may then determine whether the frame relates to synchronization, and if so, places the timestamp into a first data structure, such as a first queue, along with a frame association for recovery by a followup processing layer (e.g., software) of the device.

Also, according to embodiments of the disclosure, upon receiving a frame for transmission, the sync recognition layer may add to the frame a frame identification (ID) that includes an indication of whether to timestamp the frame and may pass the received frame and frame ID down the protocol stack toward the PHY layer. The PHY layer may then determine whether the frame ID indicates that the frame is to be timestamped, and if so, places a timestamp for the frame into a second data structure, such as a second queue, along with the frame ID for recovery by a followup processing layer of the device at the point that it knows when the frame was or will be transmitted over the network.

Description

A computer network typically comprises a plurality of interconnected entities. An entity may consist of any network device, such as a server or end station, that "sources" (i.e., transmits) or "sinks" (i.e., receives) data frames. A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack).

One or more intermediate network devices are often used to couple LANs together and allow the corresponding entities to exchange information. For example, a bridge may be used to provide a "bridging" function between two or more LANs or end stations. Typically, the bridge is a computer and includes a plurality of ports that are coupled to the LANs or end stations. Ports used to couple bridges to each other are generally referred to as a trunk ports, whereas ports used to couple bridges to LANs or end stations are generally referred to as access ports. The bridging function includes receiving data from a sending entity at a source port and transferring that data to at least one destination port for forwarding to a receiving entity.

Although bridges may operate at various levels of the communication protocol stack, they typically operate at Layer 2 (L2) which, in the OSI Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to whom the message is being sent, referred to as the destination address. To perform the bridging function, L2 bridges examine the MAC destination address of each data frame received on a source port. The frame is then switched onto the destination port(s) associated with that MAC destination address.

Other devices, commonly referred to as routers, may operate at higher communication layers, such as Layer 3 (L3) of the OSI Reference Model, which in Transmission Control Protocol/Internet Protocol (TCP/IP) networks corresponds to the Internet Protocol (IP) layer. Packets at the IP layer also include a header which contains an IP source address and an IP destination address. Routers or L3 switches may re-assemble or convert received data frames from one LAN standard (e.g., Ethernet) to another (e.g. token ring). Thus, L3 devices are often used to interconnect dissimilar subnetworks.

FIG. 1 is a schematic block diagram of an example computer network 100 illustratively comprising nodes/devices (A and B), such as bridges/switches and/or routers, interconnected by links as shown. Those skilled in the art will understand that any number of nodes, devices, links, etc. may be used in the computer network, and that the view shown herein is for simplicity. Those skilled in the art will also understand that while the embodiments described herein are described generally, they may apply to any network configuration within an Autonomous System (AS) or area, or throughout multiple ASes or areas, etc. The computer network 100 of FIG. 1 is meant for illustration purposes only and is not meant to limit the embodiments described herein.

Frames (or data packets) 150 (e.g., traffic) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. As such, each bridge or router includes one or more ports/interfaces for receiving and forwarding the network messages.

Figure 2:
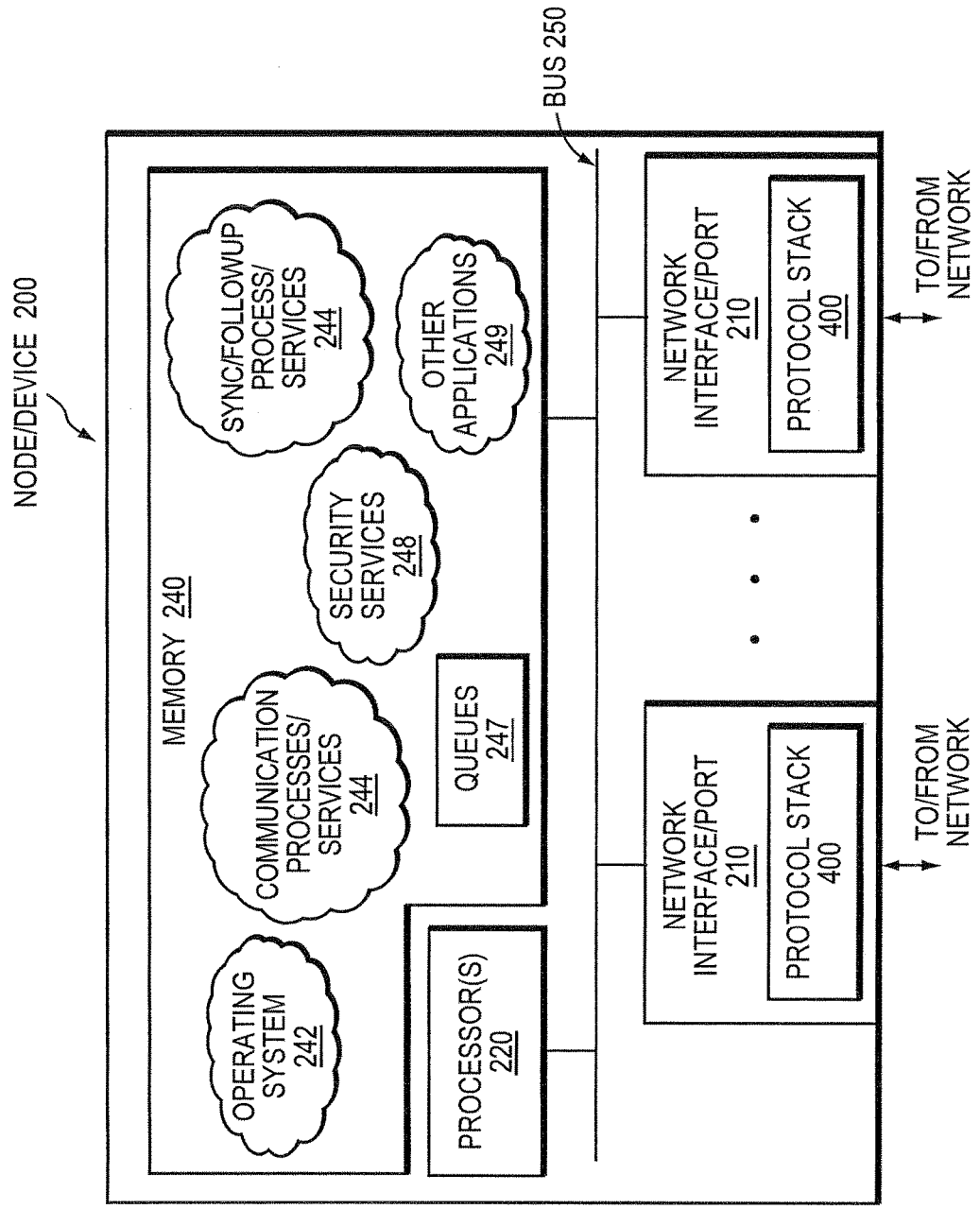
FIG. 2 illustrates an example network device/node.

FIG. 2 is a schematic block diagram of an example node/device 200 that may be advantageously used with one or more embodiments described herein, e.g., as a bridge (L2) or router (L3). The device comprises a plurality of network interfaces or ports 210, one or more processors 220, and a memory 240 interconnected by a system bus 250. The network interfaces/ports 210 contain the mechanical, electrical, and signaling circuitry for communicating data over physical links coupled to the network 100. The network interfaces/ports may be configured to transmit and/or receive data (packets/frames 150) using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface/port 210 may also be used to implement one or more virtual network interfaces, such as for Virtual Private Network (VPN) access or Virtual LANs (VLANs), as will be understood by those skilled in the art. Illustratively, the handling of frames/packets 150 within the network interfaces/ports 210 may conform to a protocol stack 400 (described below) that defines the functions performed by the data link and physical layers of a communications architecture.

The memory 240 comprises a plurality of storage locations that are addressable by the processor(s) 220 and the network interfaces/ports 210 for storing software programs and data structures associated with the embodiments described herein. The processors 220 may comprise necessary elements or logic adapted to execute the software programs and manipulate the data structures, such as one or more queues 247. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise communication process/services 244, security process/services 248, synchronization (sync)/followup process/services 246, and other applications 249, such as various software programs used for various known purposes. It will be apparent to those skilled in the art that other processor and memory means, including various computer-readable media, may be used to store and execute program instructions pertaining to the inventive technique described herein.

Communication process/services 244 contain computer executable instructions executed by the processors 220 to perform functions provided by one or more communication protocols, such as various switching or routing protocols (e.g., for bridges or routers, respectively). These functions may be configured to manage a switching databases (e.g., spanning tree instances, not shown) or forwarding information databases (also not shown) containing, e.g., data used to make switching/forwarding decisions.

Security process/services 248 contain computer executable instructions executed by the processors 220 to perform functions provided by one or more security protocols, such as Media Access Control security (MACsec, IEEE Std. 802.1AE) or Internet Protocol security (IPsec). These functions may include certain encryption/decryption services, as may be understood by those skilled in the art. In particular, when a frame/packet 150 is transmitted, security services 248 may encrypt the frame in a manner that hides the contents from other nodes within the network that are not knowledgeable of an encryption key. The authorized receiving node with the encryption key may use its security services 248 to decrypt the frame/packet 150 to determine the hidden contents, accordingly.

In addition, as mentioned above, it is often desirable to measure the time it takes for a frame (or packet) 150 to travel from one device in a computer network to another, such as for determining a transmission delay across the network for various diagnostic and contractual verification reasons, and to synchronize the time-of-day clocks among network devices. Certain timestamp protocols, however, do not account for delay associated with the queue waiting time of the frame, the time taken for security protocols to encrypt or decrypt a frame, nor do they account for the difficulties associated with protection provided by various security protocols.

Various timestamp protocols make use of a sync/followup message exchange to alleviate some of the above concerns with timestamping. For instance, according to IEEE Std. 1588-2004 and IEEE Project 802.1AS (currently under development), a sync packet may be sent separately from a followup packet. Recognition of the transmission or reception of a sync packet (e.g., by hardware) causes a timestamp to be recorded (e.g., by the port ASIC) in some format convenient to the implementation. A followup packet may then be generated by software, and contains the timestamp(s) that describe the transmission or reception of a previous sync packet.

Figure 3:
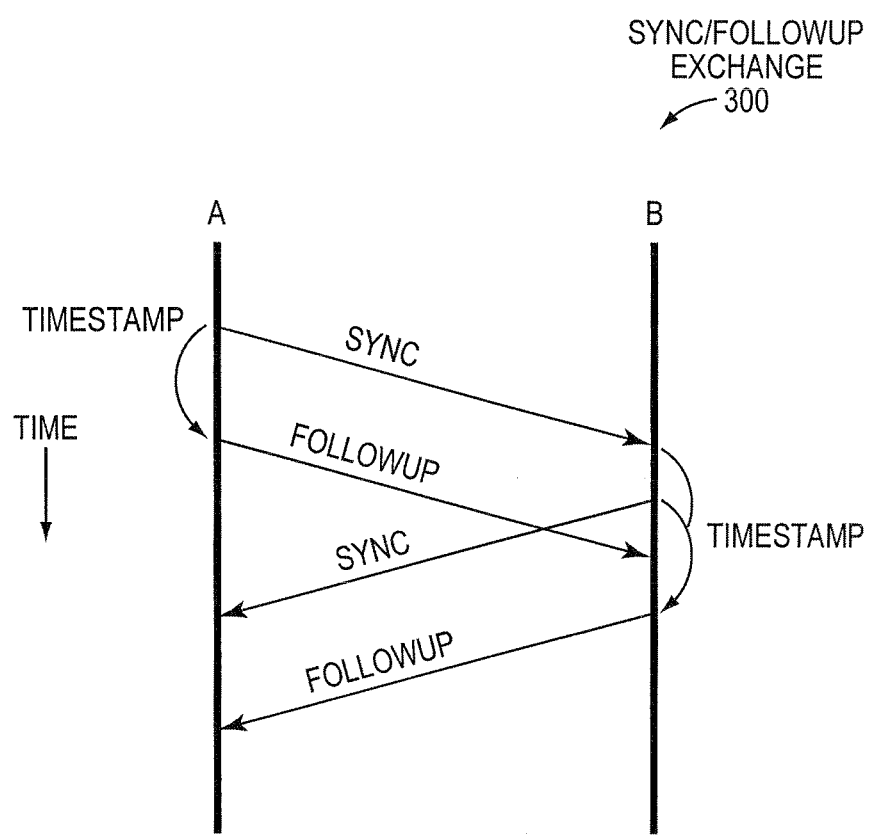
FIG. 3 illustrates an example sync/followup packet exchange.

Illustratively, sync/followup process/services 246 contain computer executable instructions executed by the processors 220 to perform functions provided by one or more timestamp protocols. For instance, FIG. 3 illustrates an example sync/followup message exchange in accordance with various timestamp protocols, such as IEEE Std. 1588-2004 and IEEE Project 802.1AS. For example, assume that node A and node B of FIG. 1 wish to determine the time (delay) associated with transmitting packets between one another. Node A may transmit a sync packet/frame (150) to node B, and may internally generate a first timestamp when the sync packet is transmitted. Node A may then transmit a followup packet/frame to node B that contains the timestamp. In this manner, the timestamp may be generated as close to the transmission of the sync packet as possible, but the information generated by the timestamp may be relayed at a later time to allow for processing time within the devices.

Upon receipt of the sync packet, Node B may generate a second timestamp when the first sync packet is received, and may return a sync packet to node A, and may generate a third timestamp when the return sync packet is transmitted. After processing the timestamps at node B, a return followup packet may be transmitted from node B to node A that comprises the second and third timestamps. (Note that in certain embodiments of timestamp protocols, the returned sync packet from node B may contain the second timestamp.) In this manner, the sync processing and the timestamp generation are separated within the devices in order to achieve more accurate timestamps.

However, even with this approach in FIG. 3, problems may still remain. For example, while the separation of sync processing and timestamp processing offers certain benefits, the underlying hardware used to manage and maintain the separate packet processing and exchange (300) is faced with difficulties. For instance, the recognition of sync packets by low-level hardware can be prevented if security/encryption is employed. Particularly, sync recognition hardware may be unable to parse a sync packet from an encrypted frame. Also, multiple protocols based on the sync/followup mechanism could be employed simultaneously (e.g., by a service provider), complicating the task of matching syncs and timestamps. Further, the fact that other protocols, such as security, OAM (operation, administration, and management) or pause protocols, can insert or remove frames from the data flow between sync recognition and timestamping can make it additionally difficult to match syncs and timestamps. That is, the determination as to whether a timestamp is needed may be several steps removed from the actual timestamp itself, and the synergy between the sync packet and the timestamp may be lost or otherwise difficult to collaborate.

Supporting Sync/Followup Timestamps

The one or more embodiments described herein are designed to alleviate the problems mentioned above, and to provide for efficient (accurate and manageable) support for sync/followup timestamp exchanges in Ethernet MAC hardware. In particular, according to techniques described herein, recognition of sync packets may be performed by a device at a relatively higher layer in the protocol stack (e.g., above MACsec), and separately from the taking of timestamps. Also, timestamps are taken on transmitted and received packets at a very low layer in the protocol stack, e.g., as close to the physical layer as possible, and separately from sync recognition. A frame ID is generated and attached as a separate piece of information in every frame passed between the sync recognition and timestamp (physical) layers (down the stack). Also, a timestamp is generated and attached as a separate piece of information in substantially every frame passed between the timestamp and the sync recognition layers (up the stack). For substantially every sync frame/packet received at the device, the sync recognition layer places a frame ID and the timestamp into a first queue for consumption by the upper layers (e.g., software) that generate and process followup packets. For every sync frame transmitted from the device, the timestamp layer places the frame ID and a timestamp into a second queue for consumption by the upper, followup processing, layer. In addition, intermediate layers of the stack may pass the frame ID or timestamp transparently.

Figure 4:
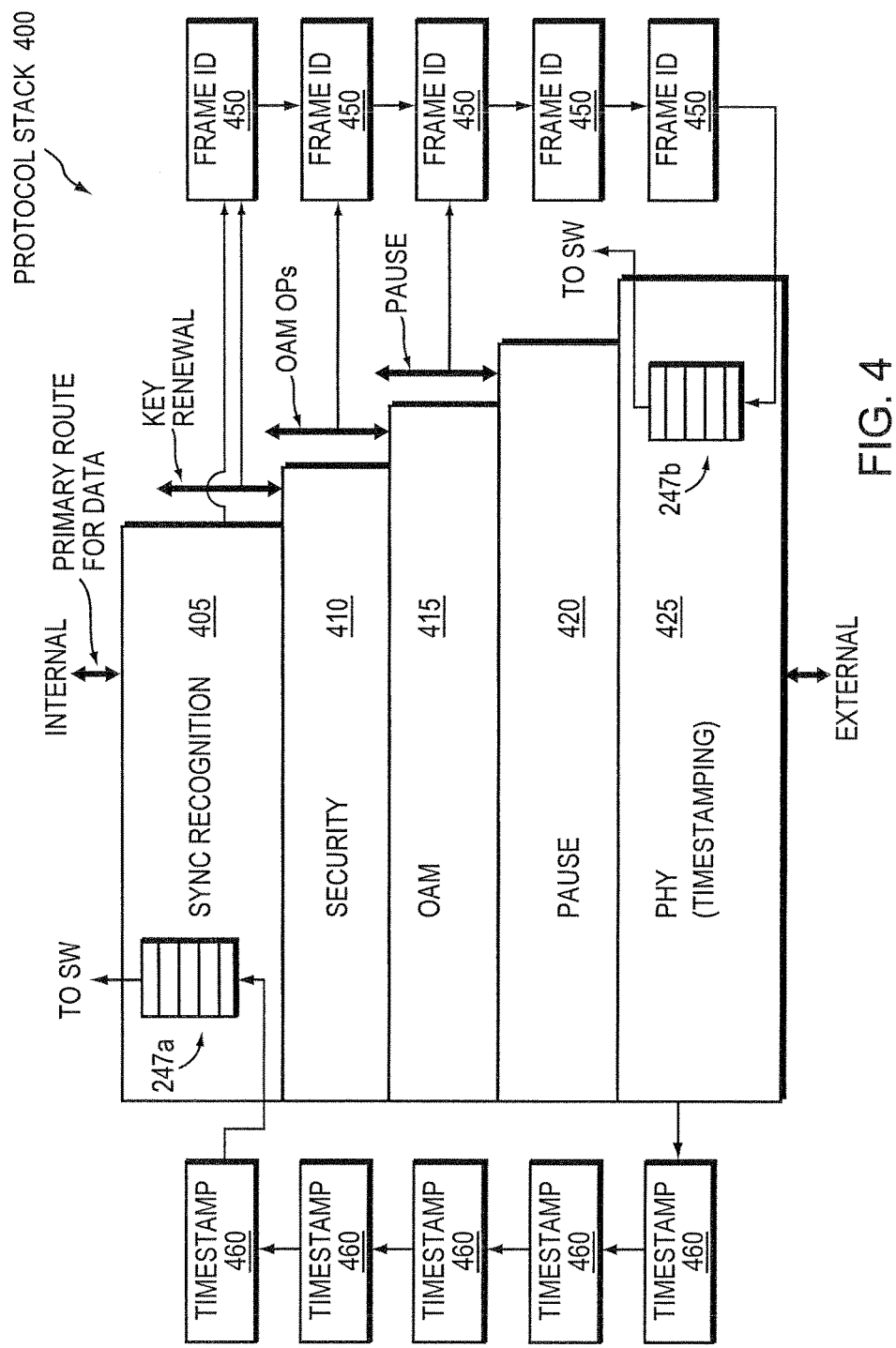
FIG. 4 illustrates an example protocol stack.

Illustratively, the techniques described herein may be performed by hardware, software, and/or firmware, such as sync/followup process/services 246 (e.g., using an exchange in a manner described above in FIG. 3), queues 247, and a port/transmission protocol stack 400. In particular, FIG. 4 illustrates an example protocol stack 400 that may be used in accordance with one or more embodiments described herein. As those skilled in the art will understand, a protocol stack 400 delineates a representative order in which various protocols ("layers") are configured to operate on an object. Typically, an object, such as a frame/packet 150, may pass from "upper" layers of the stack to "lower" layers, or in reverse, from lower layers to upper layers, depending on the direction of the object. For instance, protocol stack 400 illustrates a port/transmission stack (e.g., located on network interface 210), and thus represents the handling of frames/packets 150 as they are transmitted from the device 200 (interface 210) and received at the device. For instance, frames that are to be transmitted from the device 200 may be pass through the stack 400 from upper layers (e.g., internal data) to lower layers, before arriving at a physical (PHY) layer 425 for transmission into the network 100 (e.g., becoming external data). Conversely, frames that are received at the device (by PHY layer 425) from the network may be passed up the stack 400 to a process internal to the device, such as one or more software processes (e.g., applications 249, etc.).

In accordance with the techniques described herein, a synchronization (sync) recognition layer 405 may be located at an upper layer of the protocol stack, e.g., the top of the stack 400. Sync recognition layer 405, as described herein, operates to parse frames 150 passed through the stack to determine whether the frame is a sync packet. For the reasons set forth herein, the sync recognition layer 405 is at an upper layer of the stack 400 such that other intermediate layers (that is, between the sync recognition layer 405 and PHY layer 425) may operate on the frame 150 prior to the sync recognition operation. For example, intermediate stack layers may comprise, inter alia, a pause layer 420 (e.g., 802.3x Pause), an operation, administration, and management (OAM) layer 415 (e.g., 802.3ah OAM), and a security layer 410 (e.g., MACsec), as may be understood by those skilled in the art. Illustratively, the intermediate layers 410-420 may be located below the sync recognition layer 405 such that for transmitted or received frames 150, any security, encryption, etc., that may be placed on a sync packet will not yet have been placed (transmission) or will have been removed (reception), and thus sync recognition may occur on the baseline packet.

Operationally, according to embodiments of the disclosure, upon receiving a frame 150 at the device 200 (e.g., a frame received externally at Node B), the PHY layer adds a timestamp 460 to the received frame, and passes the received frame 150 and timestamp 460 up the protocol stack 400 toward sync recognition layer 405 (left side of FIG. 4). For instance, because the PHY layer 425 is typically unaware of the type of frame 150 that has been received, the PHY layer timestamps every frame that is received as an assurance that any received sync packets are timestamped prior to determining that they are sync packets (in this manner, the PHY layer 425 acts as or in conjunction with a timestamping layer).

Illustratively, as mentioned above, any intermediate stack layers may first perform any necessary operations on the passed frame 150, e.g., passing from pause layer 420 to OAM layer 415, and to security layer 410 prior to reaching the sync recognition layer 405. Additional hardware may be present within the stack 400 (e.g., within network interface 210) to pass the timestamp 460 through the stack in parallel along with the frame 150. If any of the intermediate layers need the timestamp 460, it is available to them, however, if the timestamp is not needed, the intermediate layers may simply ignore the timestamp as the frame 150 and timestamp 460 are passed toward the sync recognition layer.

Once the frame 150 reaches the sync recognition layer 405, and, notably, has passed through any necessary security layers 410 to decrypt any encrypted frames, the sync recognition layer may then determine whether the frame relates to synchronization, that is, whether the frame is a sync packet. If the frame 150 is not a sync packet, then sync recognition layer 405 may ignore the frame, and may pass the frame to any higher layers, e.g., software processes internal to the device 200. If, on the other hand, the frame is a sync packet (e.g., sent from Node A), the sync recognition layer 405 places the associated timestamp 460 into a first queue 247a, such as a first-in-first-out (FIFO) queue. The sync packet 150 and timestamp 460 (from queue 247a) may then be passed to (recovered by) a followup processing layer (e.g., software, such as sync/followup process 246) for processing.

Notably, to ensure that the timestamp 460 corresponds to the correct sync packet 150 at the followup processing layer (process 246), the sync recognition layer may also pass a frame association along with the timestamp in queue 247a. For instance, while a FIFO queue and the ordered placement it offers provides for a type of frame association (that is, the first sync packet corresponds to the first timestamp, the second to the second, etc.), other identifiers may be used, such as a frame identification (ID) value appended to at least one of the timestamp or frame for correlation by the followup processing layer. Further, sync recognition layer 405 may also reformat the timestamp (which presumably is in some format suitable for the PHY layer 425) into another format, and insert the reformatted timestamp into the frame 150 for consumption by higher protocol stack layers.

Also, according to embodiments of the disclosure, upon receiving a frame for transmission at the protocol stack 400 (e.g., a frame 150 received internally from within Node B to be transmitted externally into the network 100), the sync recognition layer 405 may add a frame ID 450 to the frame. In particular, the sync recognition layer 405 may, for each frame, determine whether the frame relates to synchronization (that is, whether the frame is a sync packet being sent out of the device, e.g., to Node A), and if so, adds a frame ID 450 to the frame 150 that indicates that the frame is to be timestamped. The frame ID 450 is illustratively any format of identification that creates a unique (to the timestamp process, e.g., sync/followup process 246) identifier. For example, a 16-bit field may be used, where certain bits may be used to indicate a source of the ID, while the remaining bits are used as a rolling sequence of unique ID values. Alternatively or in addition, the frame ID 450 may comprise a bit that indicates that the corresponding frame 150 is a sync packet, and thus requires timestamping. Illustratively, each frame 150 receives a frame ID 450, regardless of whether it is to receive a timestamp (e.g., is a sync packet), in order to ensure proper alignment of a frame ID with the frame requiring a timestamp. As such, according to one or more embodiments described herein, a frame ID for a frame that need not be timestamped may simply be an empty placeholder frame ID.

Once the frame 150 is given a frame ID 450 (e.g., an actual frame ID or a placeholder ID), the sync recognition layer 405 may then pass the received frame and frame ID down the protocol stack toward the PHY layer 425 (right side of FIG. 4). Again, as noted above, additional hardware may be present within the stack 400 (e.g., within network interface 210) to pass the frame ID 450 through the stack in parallel along with the frame 150. Also, the frame and frame ID may be passed down the protocol stack through one or more intermediate stack layers to the PHY layer 425, e.g., through security layer 410 (e.g., MACsec), OAM layer 415 (e.g., 802.3ah OAM), and pause layer 420 (e.g., 802.3x Pause). The frame ID may be passed transparently through the intermediate layers, as the frame ID is generally intended for sole use by the PHY layer 425 (if other uses for the frame ID are necessary, the frame ID is available to the intermediate stack layers). As such, the frame ID 450 need not have security applied thereto (e.g., need not be encrypted), since the frame ID is not part of the frame to be transmitted from the device 200.

Notably, there may be instances during the passage of the frame 150 that the intermediate stack layers receive a frame from a source other than a previous upper stack layer. For instance, as opposed to receiving a frame from sync recognition layer 405, the security layer 410 may receive a frame directly from security process 248, such as a key renewal frame. Also, OAM operations and pause frames may be received directly at the OAM layer 415 and pause layer 420, respectively. Accordingly, each layer adapted to directly receive frames 150 may be configured to add a frame ID to the received frame in conformance with the frame IDs generated by the sync recognition layer. In other words, the frame ID 450 should have an indication of whether to timestamp the frame, as well as an indication of the source of the frame (i.e., which layer generated the frame to keep IDs unique and identifiable between layers). Conversely if no timestamp is requested by the directly received frame at the intermediate stack layers, the frame ID 450 may be a placeholder frame ID with no information, as mentioned above.

Upon receiving the frame 150 and frame ID 450, the PHY layer 425 (e.g., as or with the timestamping layer) may then determine whether the frame ID indicates that the frame is to be timestamped. In particular, the PHY layer 425 examines the frame ID 450 and not the frame 150, since the frame may have been encrypted (or otherwise modified) by intermediate layers (e.g., 410-420). If the frame ID indicates that the frame is to be timestamped (e.g., is a sync packet, or otherwise requests timestamping), then the PHY layer 425 generates and places a timestamp 460 for the frame into a second FIFO queue 247b along with the frame ID 450 of that frame for recovery by a followup processing layer (e.g., sync/followup process 246), e.g., at the point that it knows (substantially exactly) when the frame was or will be transmitted. The PHY layer 425 may then transmit the frame 150, e.g., substantially close to the time the frame is time-stamped.

Accordingly, because the determination of whether to timestamp a frame (e.g., sync recognition layer 405) is several steps removed from the actual timestamp (e.g., PHY layer 425), the frame is identified in a manner that allows for the correlation of the timestamp 460 to the frame 150 by the followup processing layer. For instance, while a FIFO queue 247b may function appropriately, due to the possible insertion of frames from intermediate stack layers (e.g., 410-420), the frame ID may be used to alleviate any confusion as to which timestamp corresponds to which frame. (Note that the sync recognition layer 405 may have already submitted the generated frame ID 450 to the followup processing layer for correlation to the frame ID in queue 247b for the associated timestamp 460.)

After the frame 150 is timestamped and transmitted (e.g., a sync packet to Node A), the followup processing layer (e.g., sync/followup process 246) may recover the timestamp 460, and using the frame IDs 450 of the frames, match the correct timestamp to the associated frame. In accordance with an illustrative sync/followup procedure as shown above in FIG. 3 (exchange 300), the device (Node B) may transmit a followup packet containing the timestamp generated for the previously transmitted sync packet. Accordingly, the timestamp value in the followup packet is accurate, and was generated efficiently within the stack 400 in a manner that allows for security to be placed on both the sync packets and the followup packets.

Figure 5:
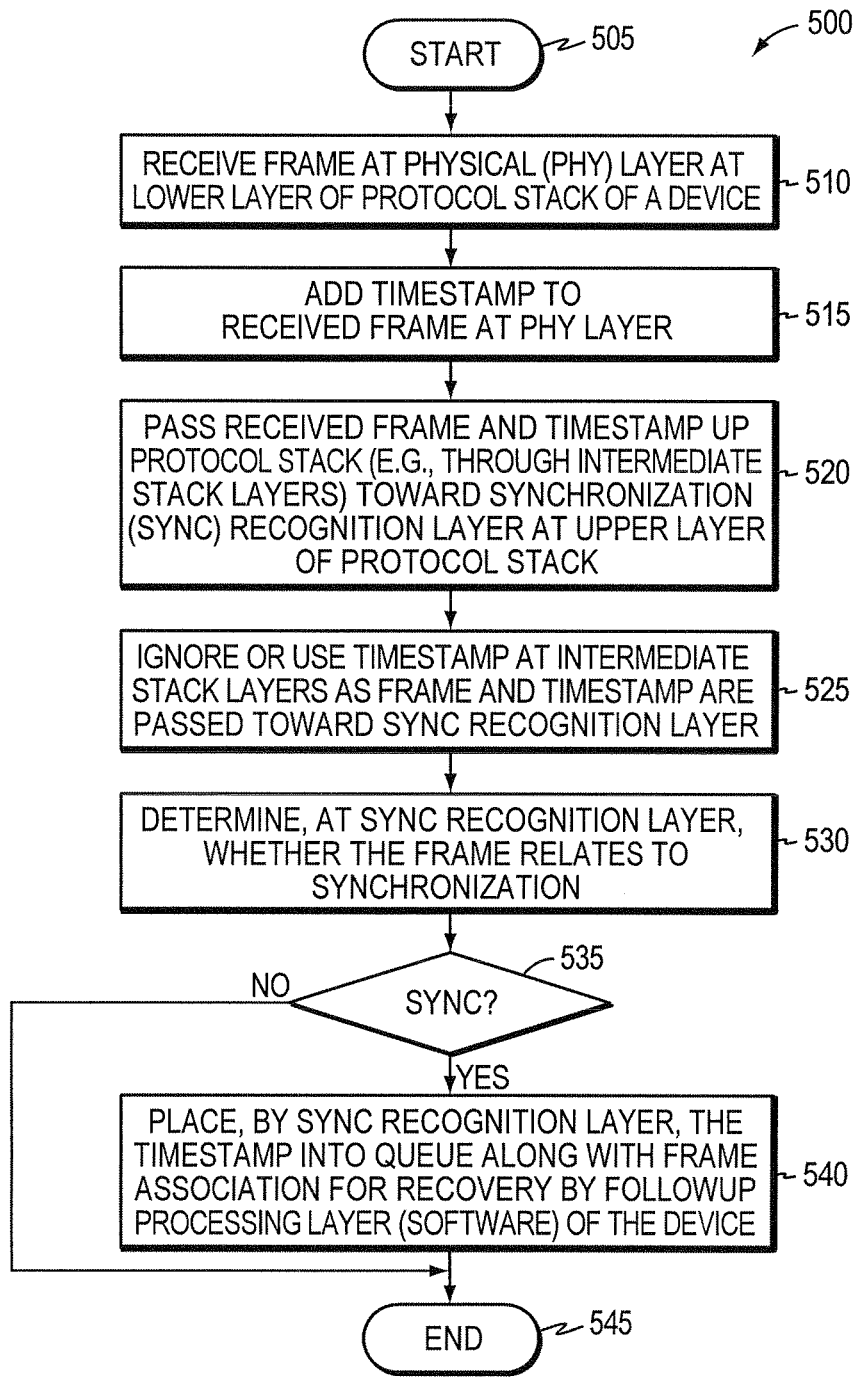
FIG. 5 illustrates an example procedure for supporting sync/followup timestamps for received frames.

FIG. 5 illustrates an example procedure for supporting sync/followup timestamps in accordance with one or more embodiments described herein, particularly for incoming sync/followup packets. The procedure 500 starts at step 505, and continues to step 510, where a frame 150 is received at a PHY layer 425 at a lower layer of protocol stack 400 of a device 200 (e.g., from an external source to the device). Regardless of the frame 150, the PHY layer 425 adds a timestamp 460 in step 515, and in step 520 passes the frame and timestamp up the protocol stack 400 (e.g., through intermediate stack layers 420-410) toward sync recognition layer 405 at an upper layer of the protocol stack. Along the way, any intermediate stack layer that is interested in the timestamp 460 may utilize it in step 525, otherwise the timestamp is ignored and passed transparently.

Upon receiving the frame 150 and timestamp 460, the sync recognition layer 405 determines in step 530 whether the frame relates to synchronization (e.g., is it a sync packet). If so (step 535), then in step 540 the sync recognition layer places the timestamp 460 into a queue 247a along with a frame association (e.g., frame ID) for recovery by a followup processing layer (e.g., process 246) of the device. Subsequently, or in response to the frame not relating to synchronization (step 535), the procedure 500 for handling an incoming frame 150 to support sync/followup timestamps ends in step 550.

Figure 6:
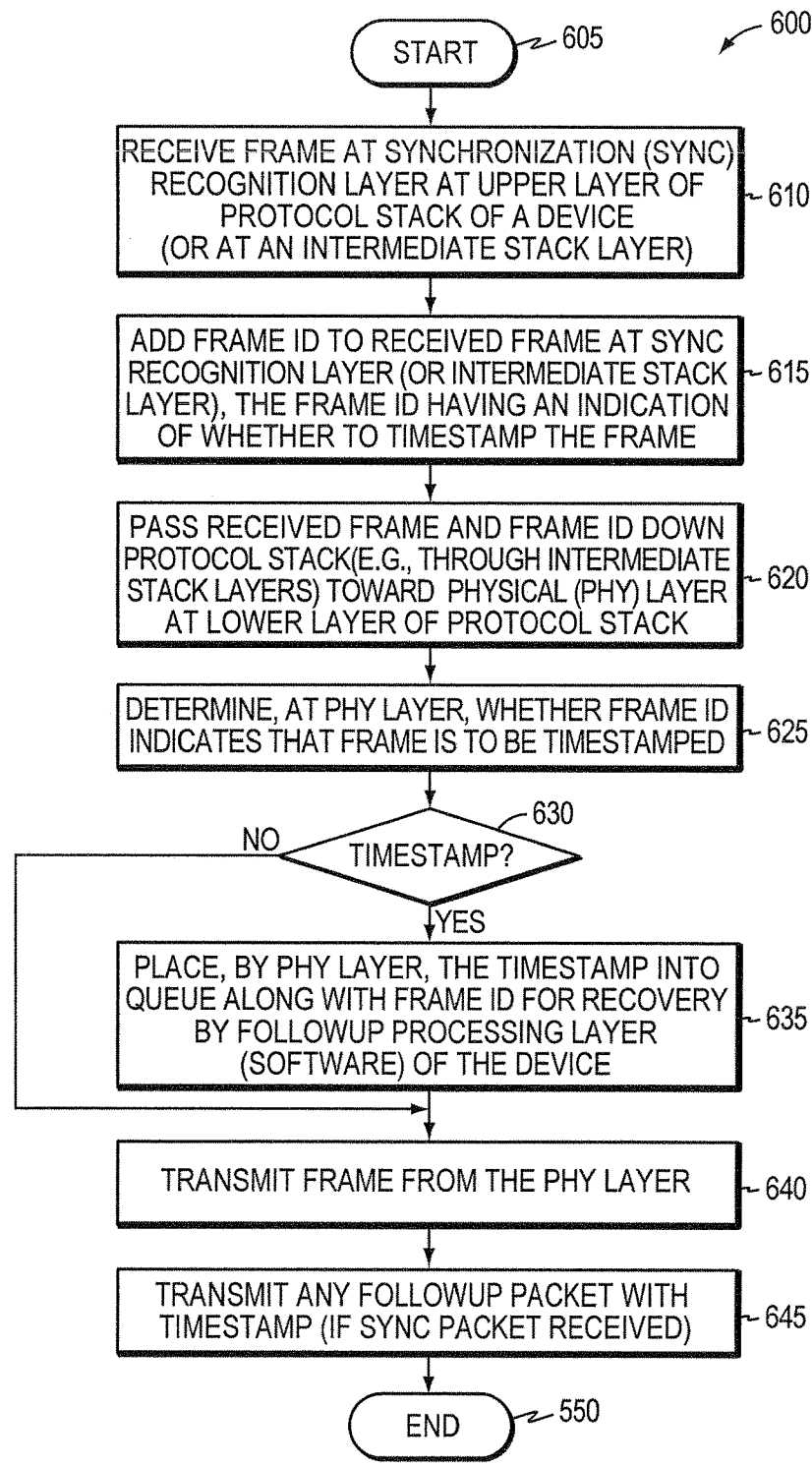
FIG. 6 illustrates an example procedure for supporting sync/followup timestamps for transmitted frames.

Conversely, FIG. 6 illustrates an example procedure for supporting sync/followup timestamps in accordance with one or more embodiments described herein, particularly for outgoing sync/followup packets. The procedure 600 starts at step 605, and continues to step 610, where a frame 150 is received at the sync recognition layer 405 at an upper layer of the protocol stack 400 of a device 200 (e.g., from an internal source within the device). At step 615, the sync recognition layer adds to the frame a frame ID 450 having an indication of whether to timestamp the frame. For instance, as mentioned above, the sync recognition layer may mark the frame for timestamping if it is a sync packet, or may leave a blank/placeholder frame ID for other, non-timestamped packets. The received frame 150 and frame ID 450 are then passed down the protocol stack in step 620 (e.g., through intermediate stack layers 410-420) toward PHY layer 425 at a lower layer of the protocol stack 400. Notably, step 610 and 615 may occur initially at any of the intermediate stack layers 410-420, as described above. As such, if an intermediate layer wishes to insert a frame 150 into the stack 400, then a corresponding frame ID 450 may be created (e.g., empty/placeholder, or otherwise as mentioned above) for the PHY layer 425.

Upon receiving the frame 150 and frame ID 450, the PHY layer 425 determines in step 625 whether the frame ID indicates that the frame is to be timestamped (e.g., is a sync packet). If so (step 630), then in step 635 the PHY layer places a timestamp 460 into a queue 247b along with the frame ID for recovery by a followup processing layer (e.g., process 246) of the device, e.g., at the point that it knows when the frame was or will be transmitted. Subsequently, or in response to the frame not requiring a timestamp (step 630), the PHY layer 425 transmits the frame 150 in step 640, e.g., to an external device. In addition, in the event the transmitted frame 150 in step 640 is a sync packet, then the device 200 may transmit a followup packet with the appropriate timestamp 460 in step 645, accordingly. The procedure 600 for handling an outgoing frame 150 to support sync/followup timestamps ends in step 650.

Advantageously, the novel techniques described herein support sync/followup timestamps in a computer network. By separating sync recognition and timestamp generation, the novel techniques allow for accurate and efficient timestamping by providing maximum accuracy and allowing the use of intermediate protocol stack layers. In particular, by passing a frame ID transparently down the stack between sync recognition and timestamp generation or passing the timestamp up the stack, the techniques described herein maintain a synergy across multiple protocol stack layers, and do not require that the timestamp layer be able to parse frames in order to identify sync packets, nor that the sync recognition layer be able to handle timestamps. Furthermore, the techniques above are compatible with MACsec and with new sync/followup protocols, and new protocol stack layers may be added to the stack without requiring changes to the timing features in the hardware.

While there have been shown and described illustrative embodiments that support sync/followup timestamps in a computer network, it is to be understood that various other adaptations and modifications may be made within the spirit and scope of the present invention. For example, the embodiments have been shown and described herein for use with particular sync/followup packet transmission techniques. However, the embodiments of the invention in their broader sense are not so limited, and may, in fact, be used with other sync/followup techniques. Also, while certain protocol stack layers are shown for Ethernet MAC hardware, additional and/or fewer stack layers may be present in a device configured to operate in accordance with the embodiments described herein, e.g., L3 devices (routers), etc.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

The invention claimed is:

1. A method, comprising:
   determining, via a processor and at a synchronization recognition layer of a protocol stack, whether a frame relates to synchronization, to yield a determination;

assigning, at the synchronization recognition layer, a frame identification to the frame based on the determination; and upon determining, at a physical layer of the protocol stack, that the frame identification indicates that the frame relates to synchronization, generating a timestamp to be associated with the frame, wherein,
the frame identification assigned to the frame is a placeholder identification with no information when it is determined that the frame does not relate to synchronization.

2. The method of claim 1, further comprising:
adding the timestamp to the frame; and
transmitting the frame from the physical layer.

3. The method of claim 1, wherein the frame identification assigned to the frame comprises:
at least one bit that indicates that the frame related to synchronization; and
remaining bits representing one of a rolling sequence of unique identification values.

4. The method of claim 1, wherein the frame identification is not encrypted.

5. The method of claim 1, wherein the frame is received at the synchronization recognition layer from an upper layer of the protocol stack.

6. The method of claim 1, further comprising:
after generating the timestamp, placing the timestamp and the frame identification into a queue.

7. The method of claim 1,
wherein,
the placeholder identification is an empty frame identification.

8. A system comprising:
a processor; and
a computer-readable storage medium storing instructions which, when executed by the processor, cause the processor to perform operations comprising:
determining, at a synchronization recognition layer of a protocol stack, whether a frame relates to synchronization, to yield a determination;
assigning, at the synchronization recognition layer, a frame identification to the frame based on the determination; and
upon determining, at a physical layer of the protocol stack, that the frame identification indicates that the frame relates to synchronization, generating a timestamp to be associated with the frame,
wherein,
the frame identification assigned to the frame is a placeholder identification with no information when it is determined that the frame does not relate to synchronization.

9. The system of claim 8, wherein the computer-readable storage medium stores additional instructions which, when executed by the processor, cause the processor to perform further operations comprising:
adding the timestamp to the frame; and
transmitting the frame from the physical layer.

10. The system of claim 8, wherein the frame identification assigned to the frame comprises:
at least one bit that indicates that the frame related to synchronization; and
remaining bits representing one of a rolling sequence of unique identification values.

11. The system of claim 8, wherein the frame identification is not encrypted.

12. The system of claim 8, wherein the frame is received at the synchronization recognition layer from an upper layer of the protocol stack.

13. The system of claim 8, wherein the computer-readable storage medium stores additional instructions which, when executed by the processor, cause the processor to perform further operations comprising:
after generating the timestamp, placing the timestamp and the frame identification into a queue.

14. The system of claim 8,
wherein,
the placeholder identification is an empty frame identification.

15. A computer-readable storage device storing instructions which, when executed by a processor, cause the processor to perform operations comprising:
determining, at a synchronization recognition layer of a protocol stack, whether a frame relates to synchronization, to yield a determination;
assigning, at the synchronization recognition layer, a frame identification to the frame based on the determination; and
upon determining, at a physical layer of the protocol stack, that the frame identification indicates that the frame relates to synchronization, generating a timestamp to be associated with the frame,
wherein,
the frame identification assigned to the frame is a placeholder identification with no information when it is determined that the frame does not relate to synchronization.

16. The computer-readable storage device of claim 15, storing additional instructions which, when executed by the processor, cause the processor to perform further operations comprising:
adding the timestamp to the frame; and
transmitting the frame from the physical layer.

17. The computer-readable storage device of claim 15, wherein the frame identification assigned to the frame comprises:
at least one bit that indicates that the frame related to synchronization; and
remaining bits representing one of a rolling sequence of unique identification values.

18. The computer-readable storage device of claim 15, wherein the frame is received at the synchronization recognition layer from an upper layer of the protocol stack.

19. The computer-readable storage device of claim 15, storing additional instructions which, when executed by the processor, cause the processor to perform further operations comprising:
after generating the timestamp, placing the timestamp and the frame identification into a queue.

20. The computer-readable storage device of claim 15,
wherein,
the placeholder identification is an empty frame identification.

* * * * *